UNITED STATES PATENT OFFICE.

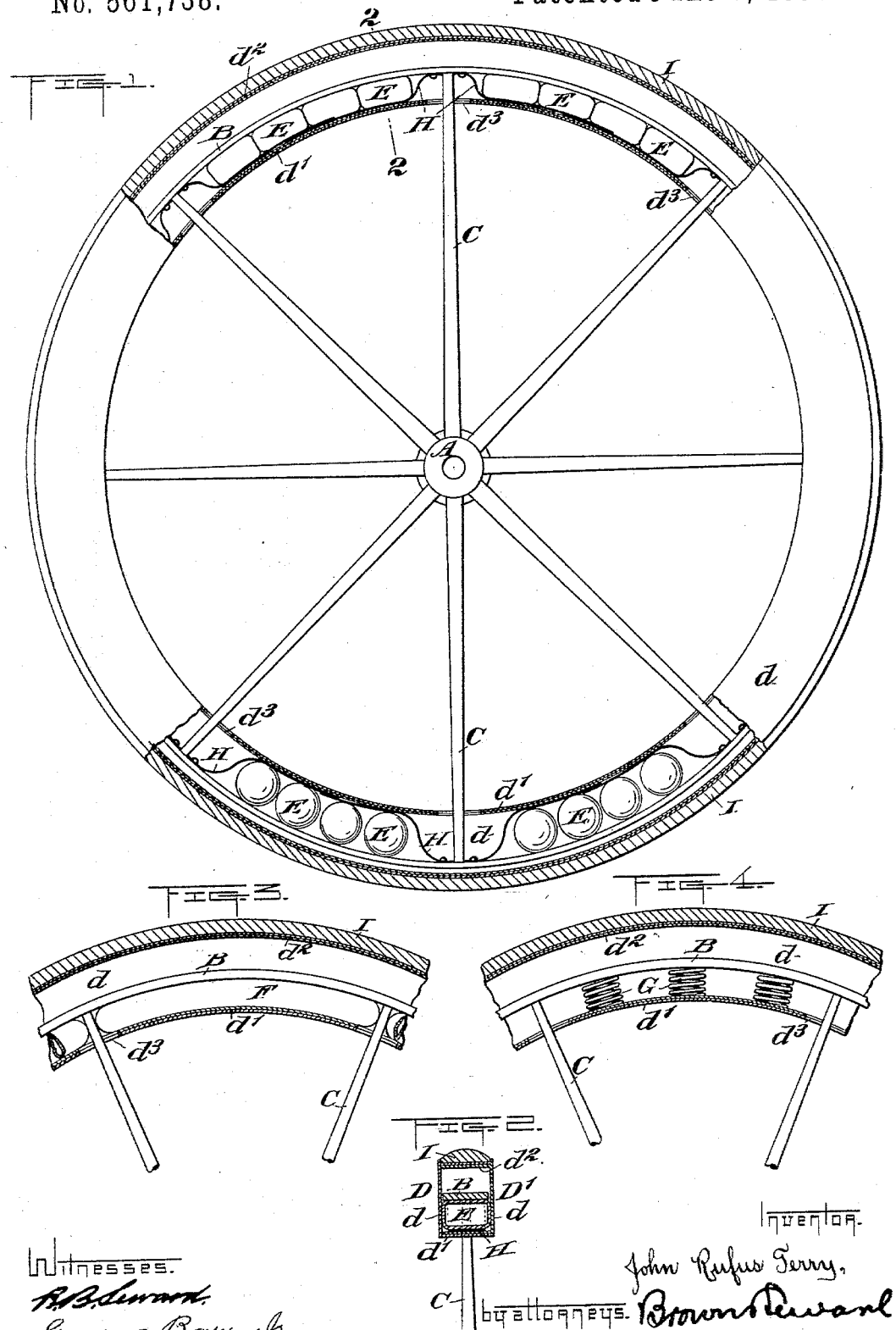

JOHN RUFUS TERRY, OF LONG ISLAND CITY, NEW YORK.

VEHICLE-WHEEL.

SPECIFICATION forming part of Letters Patent No. 561,738, dated June 9, 1896.

Application filed March 18, 1896. Serial No. 583,653. (No model.)

*To all whom it may concern:*

Be it known that I, JOHN RUFUS TERRY, of Long Island City, in the county of Queens and State of New York, have invented a new and useful Improvement in Vehicle-Wheels, of which the following is a specification.

The object of my invention is to provide a wheel in which the load carried thereby is cushioned at the top of the wheel instead of at the bottom, as is now common, thereby insuring much better results.

A further object is to provide a wheel of the above character in which the parts are held against displacement, however rough the usage the wheel may be subjected to, the structure of the wheel being at the same time very simple and strong.

A still further object is to provide a wheel which may be readily taken apart and put together for the renewal of any of the parts thereof.

A practical embodiment of my invention is represented in the accompanying drawings, in which—

Figure 1 is a side view of the wheel, the upper and lower portions of one of the side plates of the rim of the wheel being broken away to show clearly the suspension of the load at the top of the wheel. Fig. 2 is a transverse section on the line 2 2 of Fig. 1, and Figs. 3 and 4 show modified forms of cushioning the wheel.

The hub of the wheel is denoted by A, its felly by B, and the spokes which connect the hub to the felly at intervals by C.

The rim of the wheel which incloses the felly B consists of two ring-sections D D', each of said ring-sections being composed of a side plate $d$ and inner and outer laterally-extended rings $d'$ $d^2$. These rings $d'$ $d^2$ overlap when the two sections are placed in position upon the wheel and form the inner and outer walls of the rim. The side plates $d$ and inner and outer walls $d'$ $d^2$ form an annular chamber, in which the felly and the cushion are located. The inner walls $d'$ of the rim are cut away for a short distance around each of the spokes C, as shown at $d^3$, for allowing the free longitudinal and lateral movement of the spokes.

The cushion which is adapted to primarily yieldingly support the weight of the load upon the wheel is interposed between the felly B and the inner walls $d'$ of the rim, and in Fig. 1 they are denoted as a series of balls E, in Fig. 3 as an air-tube F, and in Fig. 4 as a series of coiled springs G.

When balls E are used for cushioning the wheel, they are preferably held in position between the felly and the inner walls of the rim by springs H. These springs H are preferably secured at a point near where the spokes C are secured to the felly B, and the free ends of the said springs extend along between the balls E and the inner walls $d'$ of the ring. There are preferably two springs located between each two adjacent spokes, and the free ends of the springs overlap, so that the balls are allowed to freely expand and contract as the weight is removed or applied thereto. These springs H may also serve to further cushion the weight of the load should the balls E not be sufficiently strong.

In the form shown in Fig. 3 an air-tube F is interposed between the felly B and the inner wall $d'$ and extends between two adjacent spokes.

In the form shown in Fig. 4 a series of springs G are interposed between the felly and the inner walls of the rim, the said springs being shown there as of coiled form, the tendency of the coils being to expand rather than to contract.

A suitable tire I is secured in any desired manner along the outer wall of the rim, the side plates $d$ of the ring-sections being preferably extended slightly beyond the outer walls of the rim, so as to form flanges for engaging the opposite sides of the tire I.

The parts of the wheel, as above described, may be readily and quickly assembled or taken apart, and when assembled there is no liability of the wheel buckling. The overlapping walls $d'$ $d^2$ of the ring-sections D D' are caused to fit very snugly together; but, if so desired, the said walls may be secured rigidly together and not simply depend upon the friction of the overlapping parts to hold them in assembled adjustment.

It will be seen from the above description that the load upon the wheel is cushioned at the upper portion therefor and that the cushions interposed between the felly and the inner walls of the rim along the bottom portion of the wheel have no strain whatever. This suspension of the load at the top of the wheel produces very advantageous results, as far as easy riding and the life of the vehicle are concerned, for the reason that much of the vibration incident to rough work is absorbed by the rim of the wheel before reaching the cushioned portion thereof.

It is obvious that slight changes in the form and arrangement of the several parts herein described might be resorted to without departing from the spirit and scope of my invention. Hence I do not wish to limit myself strictly to the structure herein set forth; but

What I claim is—

1. A vehicle-wheel, comprising a felly, a hub, spokes connecting the felly with the hub, a rim free to move independently of the felly and provided with bearings intermediate the felly and hub and a cushion interposed between the inner side of the felly and the said bearings for sustaining the load at the upper portion of the wheel, substantially as set forth.

2. A vehicle-wheel, comprising a felly, a hub, spokes connecting the hub with the felly, a hollow rim inclosing said felly and a cushion interposed between the felly and the inner wall of the rim whereby the load is sustained at the upper portion of the wheel, substantially as set forth.

3. A vehicle-wheel, comprising a felly, a hub, spokes connecting the hub with the felly, a rim inclosing the felly the inner walls of said rim being cut away for the admission therethrough of the spokes of the wheel and a cushion interposed between the felly and the inner wall of the rim, substantially as set forth.

4. A vehicle-wheel, comprising a hollow rim, a felly within the rim, a hub, spokes connecting the felly with the hub, yielding cushions interposed between the felly and the inner walls of the rim and springs carried by the felly engaging said cushions for yieldingly holding them in position, substantially as set forth.

5. A vehicle-wheel comprising a rim formed in two ring-sections, each section comprising a side plate, and inner and outer laterally-extended rings, the said rings of the two sections overlapping each other to form the inner and outer walls of the rim, a tire carried upon the rim, a felly within the rim, a hub, spokes connecting the felly with the hub, and a yielding cushion interposed between the felly and the inner walls of the rim, substantially as set forth.

JOHN RUFUS TERRY.

Witnesses:
FREDK. HAYNES,
IRENE B. DECKER.